Patented Jan. 2, 1934

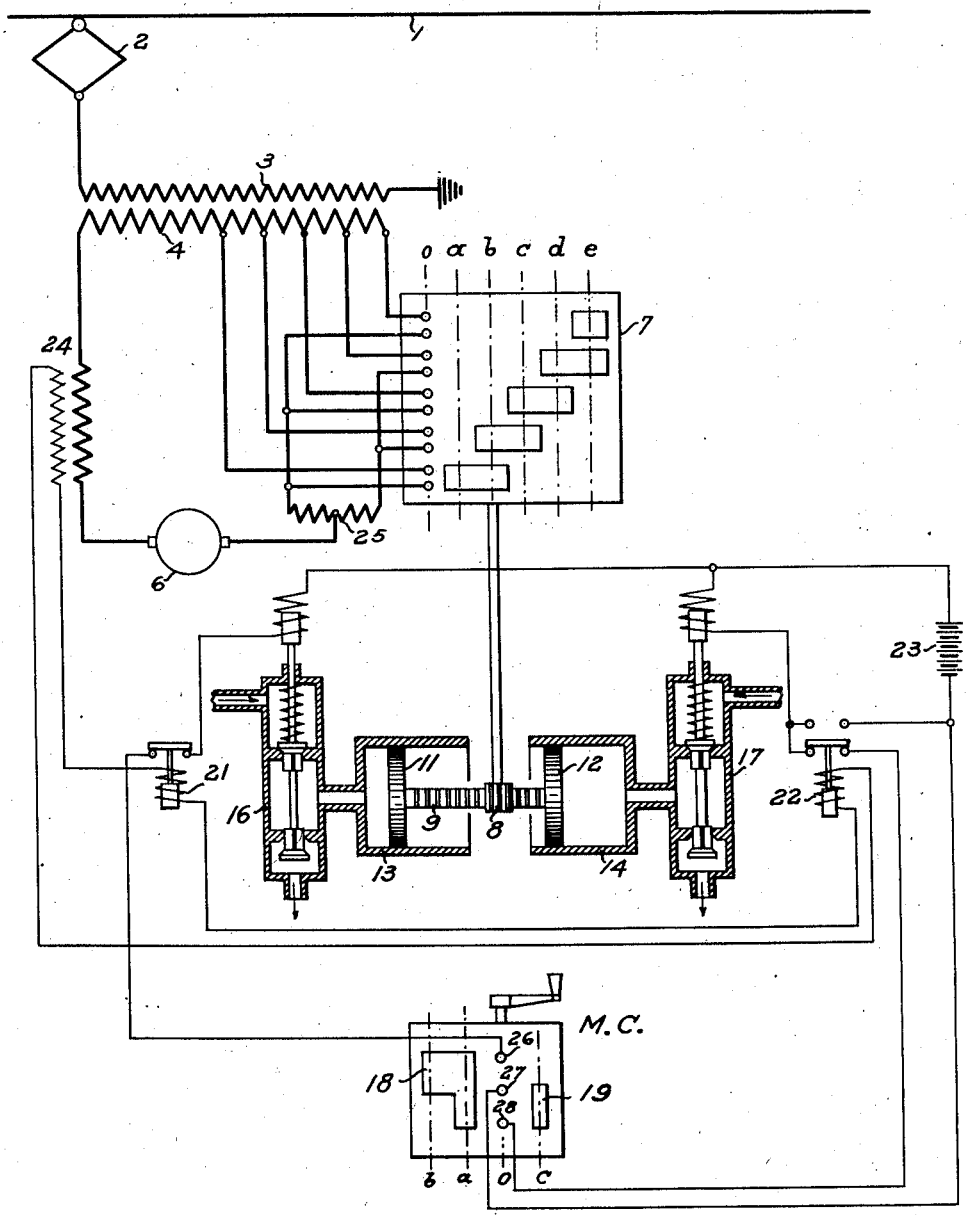

1,941,887

UNITED STATES PATENT OFFICE 1,941,887

MOTOR VEHICLE CONTROL SYSTEM

Erich Fleischhammer, Mannheim, Germany, assignor to Aktiengesellschaft Brown, Boveri & Cie., Baden, Switzerland, a joint-stock company of Switzerland Application November 5, 1930, Serial No. 493,546, and in Germany November 11, 1929

4 Claims. (Cl. 172—179)

This invention relates to control systems and particularly to pneumatically operated and electrically controlled systems for controlling the operation of electric apparatus from a remote point.

Control systems of the above character have been used particularly to control the traction motors of a plurality of individual motor cars of a train from one operating point in the train. To secure automatic operation of electrically controlled, pneumatically operated systems, an accelerating or so-called forward notching relay was provided which relay was adjusted for the permissible starting currents of the motors and rotated the motor control drum in the direction of acceleration in dependence on the momentary values of the starting current. In a railway system operating on alternating current, the relay current is not constant but decreases at the higher speed. Further, when the railway has steep grades, for a car operating on the level at high motor voltages, the car speed decreases and the motor current increases as soon as the car comes to a grade. The motor current may then become much higher than is permissible and must be reduced by manual manipulation of the control system.

It is, therefore, among the objects of the present invention to provide a control system for electric apparatus in which the current in the apparatus is retained within predetermined limits.

Another object of the invention is to provide a motor control system in which an accelerating relay automatically increases the motor current and a retardation relay automatically decreases the motor current in response to the current conditions in the motor circuit.

Another object of the invention is to provide a control system for motors in which an accelerating relay and a retarding relay retain the motor current within pre-determined limits in cooperation with a master controller by the operation of fluid valves controlling the operation of the motor controller in dependence on the current in the motor circuit.

Objects and advantages, other than those above set forth, will be apparent from the following description when read in connection with the accompanying drawing which diagrammatically illustrates one embodiment of the present invention as applied to the control system of a motor car for railway operation.

Referring more particularly to the drawing by characters of reference, the reference numeral 1 designates a supply or trolley line from which current is taken by a suitable current collector 2 and is led through the primary winding 3 of a transformer to ground, the secondary winding 4 of which is shown as being variably connected in closed circuit with a traction motor 6 through taps, as is usual. The variable connection of the secondary winding 4 with the motor 6, to obtain the different running speeds for the motor, is carried out by rotation of a motor control drum indicated at 7 successively through its control portions a, b, c, d and e which connects the several taps of the winding 4 successively with the motor through the contact fingers and contact segments of the controller and through the usual mid-tapped inductance 25. The motor controller 7 is rotated by the engagement of a pinion 8 on the end of its shaft in a rack 9 formed by the rod of pistons 11 and 12 reciprocating in the cylinders 13 and 14. A fluid operating medium under pressure from a suitable source is supplied to the cylinders under the control of electromagnetically operated valves 16 and 17.

The valves 16 and 17 are controlled jointly by the cooperation of a master controller M. C., of which only the contact segments 18 and 19 are shown, and an acceleration relay 21 adjusted to operate upon the current in the motor circuit attaining its maximum safe operating value and/or a retardation relay 22 adjusted to be operated upon the current in the motor circuit exceeding its maximum safe operating value. The operating current for the valves is obtained from a battery 23 or other suitable source of current and the relays 21 and 22 are energized by current from the secondary winding of a current transformer 24 connected into the motor circuit.

When it is desired to accelerate i. e. to cause such rotation of the motor controller 7 as to connect the higher taps of the transformer 3, 4 to the motor 6, the circuits being as shown, the master controller M. C. is manually rotated from its o position through its position a to its position b where a contact 18 bridges the fixed contact fingers 26, 27. A circuit is then completed from battery 23 through the operating coil of valve 16, over the contacts of relay 21, over the contact members 26, 18 and 27 and back to the battery. Valve 16 is operated to close the discharge port and open the inlet port thereof to admit fluid pressure which moves the pistons 11, 12 toward the right thereby rotating controller 7 which connects motor 6 to the higher voltage taps of the transformer. If the motor current reaches the maximum operating value, relay 21 is energized from the current transformer 24 and lifts its armature to interrupt the energizing circuit for the operating coil of valve 16 which then operates in the reverse direction to close its inlet port and to open its discharge port, thereby interrupting the movement of the controller 7 which comes to rest in its then adjusted position.

If it is desired to maintain the controller 7 at any particular position, and hence to maintain the motor speed at any particular value, the M. C. controller is rotated back to its position *a* in which position the contact member 18 the opposing fixed contacts 26, 27, and 28 close thereat the energizing circuits for the operating magnets of both valves 16 and 17 which operate to admit operating fluid to each of the cylinders 13, 14 and thereby prevent movement of the pistons 11 and 12 in either direction.

Assuming that the car has been operating on a level track and now comes to a steep grade, causing the car speed to decrease and the motor current reach an excessive value, both of the relays 21 and 22 are now energized from the current transformer 24 in response to over-current conditions in the motor circuit and move their armatures to open the contacts of relay 21 and deenergize the operating coil of valve 16 and to bridge the upper contact of relay 22 which connects the coil of valve 17 to the battery 23. Fluid pressure is accordingly admitted to cylinder 14 through valve 17 and exhausted from cylinder 13 thereby moving pistons 11, and 12 and rack 9 toward the left. Such rotation of pinion 8 causes reconnection of the lower voltage taps of the transformer until a permissible motor current is reached. Relay 22 is then deenergized and drops thereby reclosing the circuit previously described which is then retained.

If the motor controller is to be brought back to the zero position, the master controller is rotated to its position *c* to cause member 19 to bridge its opposing fixed contacts 26, 27, 28. The coil of valve 17 is then energized from battery 23, through contacts 27, 19, 28 of the M. C. controller and normal contacts of relay 22, and fluid pressure is admitted to the cylinder 14 and moves the piston 12 and the rack 9 toward the left and causes rotation of controller 7 in the required direction for retarding the speed of the car and finally returns the controller 7 to the "off" position *o*.

It will thus be seen that the present invention provides a control system in which the motor current or the operating current supplied to other apparatus is automatically retained within predetermined limits dependent on current conditions in the motor circuit or other apparatus. The invention is particularly useful in the operation of a railway train made up of a plurality of motor cars which are controlled from a single operating point in the train.

Although but one embodiment of the present invention has been illustrated and described, it will be apparent to those skilled in the art that various changes and modifications may be made therein without departing from the spirit of the invention or from the scope of the appended claims.

The invention claimed is:

1. In a control system, an electric motor, a source of current supply for operating the said motor, a controller movable in one and another direction to and from a plurality of positions to control thereat the connection of said source of current with said motor, means operative to effect said movements of the controller, and control means actuated responsive to and in dependence upon the flow of current from said source of predetermined value to said motor operative to actuate the first said means to arrest movement of said controller in its said one direction and operative responsive to and in dependence upon the flow of said current to said motor of value in excess of said predetermined value to actuate the first said means to cause movement of said controller in its said another direction.

2. In a control system, an electric motor, a source of current supply for operating said motor, a controller comprising a member movable in one and another direction to and from a plurality of positions to control thereat the connection of said source of current with said motor, fluid actuated means operative to effect said movements of the controller, a master controller operative to intitiate and control the actuations of said means, and relay means actuated responsive to and in dependence upon the flow of current of predetermined value from said source to said motor to affect the said fluid actuated means in such manner as to arrest movement of said controller in its said one direction, the said relay means being also actuated responsive to and in dependence upon the flow of said current to said motor of value greater than said predetermined value to affect the said fluid actuated means in such manner as to cause movement of said controller in its another direction.

3. In a control system, an electric motor, a source of current supply for operating said motor, a controller having an element selectively movable in one and another direction to and from a plurality of positions to thereat control the operative connection of said source of current with the said motor, pneumatically actuated means operative to effect said selective movements of the said member, a plurality of electromagnetically actuated valves operable to control the said pneumatically actuated means, a master controller operable to and from a plurality of positions to control thereat actuations of said valves, a relay actuated responsive to the flow of said current of predetermined value to said motor and operative upon such actuation to effect actuation of one of said valves to cause said pneumatically actuated means to arrest movement of said member in its said one direction, and a relay actuated responsive to the flow of said current to said motor of value greater than the said predetermined value and operative upon such actuation to effect actuation of another of said valves to cause said pneumatically actuated means to effect the selective movement of said member in its said another direction from any one of its said positions to any other one of its positions.

4. In a control system, an electric motor, a source of current supply for operating said motor, a controller having an element selectively movable in one and another direction to and from a plurality of positions to control thereat the connection of and variably limit the flow of current from said source to said motor, means operable to actuate said element to and from said plurality of positions, a master controller operable to a plurality of positions, the actuation of said master controller to one of its said positions being effective to cause said means to actuate the said member in its said one direction to and from each of its said positions, the actuation of said master controller to a second of its said positions being effective to cause said means to actuate the said member in its said another direction to and from each of its said positions, and movement of said master controller to another of its said positions being effective to cause said means to arrest movement of and maintain said member at any one of its said positions, a control means actuated responsive to and in dependence upon the flow of current of predetermined value from said source to said motor operative during actuation of said master controller to its said one position to cause said means to arrest movement of said member in its said one direction, and a control means actuated responsive to and in dependence upon the flow of current from said source to said motor of a predetermined value in excess of the first said predetermined value operative to actuate the first said means to cause said member to be moved in its said another direction to and from its said positions to effect reduction of said current flowing to the said motor.

ERICH FLEISCHHAMMER.